United States Patent
Chebolu et al.

(10) Patent No.: US 11,160,046 B2
(45) Date of Patent: Oct. 26, 2021

(54) METHOD AND A USER EQUIPMENT (UE) FOR ACCESSING PLURALITY OF SERVICES ON WI-FI SIMULTANEOUSLY

(71) Applicant: SAMSUNG ELECTRONICS CO., LTD., Suwon-si (KR)

(72) Inventors: Praveen Chebolu, Bangalore (IN); Venkata Raju Indukuri, Karnataka (IN); Rajat Chandrasekharan, Karnataka (IN); Srinivas Chinthalapudi, Karnataka (IN); Kedar Santosh Kumar Aalla, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 16/743,679

(22) Filed: Jan. 15, 2020

(65) Prior Publication Data
US 2021/0160807 A1 May 27, 2021

(30) Foreign Application Priority Data
Nov. 27, 2019 (IN) .............................. 201941048672

(51) Int. Cl.
| | |
|---|---|
| *H04W 60/00* | (2009.01) |
| *H04W 8/18* | (2009.01) |
| *H04W 48/16* | (2009.01) |
| *H04W 72/04* | (2009.01) |
| *H04W 84/12* | (2009.01) |

(52) U.S. Cl.
CPC ......... *H04W 60/005* (2013.01); *H04W 8/183* (2013.01); *H04W 48/16* (2013.01); *H04W 72/04* (2013.01); *H04W 84/12* (2013.01)

(58) Field of Classification Search
CPC ... H04W 60/005; H04W 8/183; H04W 48/16; H04W 72/04; H04W 84/12
See application file for complete search history.

(56) References Cited

U.S. PATENT DOCUMENTS

| | | | |
|---|---|---|---|
| 8,699,517 B2 | 4/2014 | Hong et al. | |
| 2014/0293841 A1 | 10/2014 | Rousu | |
| 2017/0105193 A1* | 4/2017 | Liu | ................. H04W 68/02 |
| 2018/0077620 A1* | 3/2018 | Hassan | ................. H04W 36/18 |

FOREIGN PATENT DOCUMENTS

| | | |
|---|---|---|
| CN | 205902096 | 1/2017 |
| KR | 10-2013-0004964 | 1/2013 |
| WO | 2018040650 | 3/2018 |

* cited by examiner

*Primary Examiner* — Joseph E Dean, Jr.
(74) *Attorney, Agent, or Firm* — F. Chau & Associates, LLC

(57) ABSTRACT

Systems and methods are described for simultaneously accessing a plurality of services on Wi-Fi. The method comprises registering a first and second Media Access Control (MAC) identification (ID) with a first and second IP Multimedia System (IMS), by use of a User Equipment (UE). The UE comprises a first MAC ID associated with a first Subscriber Identification Module (SIM) card and a second MAC ID associated with a second SIM card. Use of a first service through a first Access Point (AP) without interrupting a second service may be available with registration of a first and second MAC ID.

17 Claims, 5 Drawing Sheets

METHOD AND A USER EQUIPMENT (UE) FOR ACCESSING PLURALITY OF SERVICES ON WI-FI SIMULTANEOUSLY

CROSS-REFERENCE TO RELATED APPLICATION

This application claims the benefit of Indian Patent Application No. 201941048672, filed on Nov. 27, 2019, in the Indian Intellectual Property Office, the disclosure of which is incorporated by reference herein in its entirety.

TECHNICAL FIELD

The present subject matter is generally related to a communication network and more particularly, but not exclusively, to a method and a user equipment (UE) for simultaneously accessing a plurality of services on Wi-Fi.

BACKGROUND

Voice over Wi-Fi (VoWi-Fi) technology provides telephone services over a Wi-Fi network. VoWi-Fi enables calling and texting when users do not have a cellular signal. This is performed by connecting a mobile phone to a Wi-Fi network. Thus, rather than using the regular carrier's telecommunication network connection, users can make voice calls or text via the Wi-Fi network.

In regions with multiple service providers, Multi-Subscriber Identification Module (Multi-SIM) wireless devices have become increasingly popular. Multi-SIM smart phones allow a user to use different plans or service providers on the same mobile device. For example, one SIM may be used for call service, and another SIM may be used for data services or multimedia services.

However, some multi-SIM devices only allow a connection to one VoWi-Fi service at a time. Thus, when a user is on a Voice over Long Term Evolution (VoLTE) call on first SIM, and the user moves out of the LTE coverage area to a Wi-Fi range, a call could be transferred automatically to VoWi-Fi AP of the second SIM. However, the activities of second SIM Wi-Fi services would then be interrupted. Therefore, there is a need for systems and methods that prevent service interruptions when transferring a call between SIMs.

The information disclosed in this background of the disclosure section is the for enhancement of understanding of the general background of the disclosure and should not be taken as an acknowledgement or any form of suggestion that this information forms the prior art already known to a person skilled in the art.

SUMMARY

The present disclosure relates to a method of accessing plurality of services on Wi-Fi by a User Equipment (UE) comprising a plurality of Subscriber Identification Module (SIM) cards. The method comprises registering, by the UE, a first Media Access Control (MAC) Identification (ID) associated with a first SIM card of the plurality of SIM cards in the UE with a first Internet Protocol (IP) Multimedia System (IMS) providing a first service through a first Access Point (AP). The method further comprises registering, by the UE, a second MAC ID with a second IMS providing a second service through a second AP. Once the first MAC ID and the second MAC ID are registered, the UE simultaneously accesses the first service using first SIM card without interrupting the second service using the second SIM card.

Further, the present disclosure relates to a User Equipment (UE) for accessing a plurality of services on Wi-Fi. The UE comprises a plurality of SIM cards, wherein each of the plurality of SIM cards is associated with a Media Access Control (MAC) Identification (ID), a processor and a memory. The memory is communicatively coupled to the processor, wherein the memory stores the processor-executable instructions, which, on execution, causes the processor to register a first MAC ID associated with a first SIM card of the plurality of SIM cards with a first IP Multimedia System (IMS) providing a first service through a first Access Point (AP). The processor also registers a second MAC ID associated with a second SIM card of the plurality of SIM cards with a second IMS providing a second service through a second AP. Once the registration is performed, the processor enables the UE to simultaneously access the first service through the registered first SIM card without interrupting the second service accessed through the registered second SIM card.

According to an embodiment of the present disclosure, a method of wireless communication is described. The method may include a UE registering with a first IP Multimedia System (IMS) to access a first service over Wi-Fi using a first SIM card of a plurality of SIM cards of a UE; registering with a second IMS to access a second service over Wi-Fi using a second SIM card of the plurality of SIM cards; and accessing the first service and the second service simultaneously over Wi-Fi using the first SIM card and the second SIM card.

In some cases, the UE may communicate over a cellular network with the second SIM card; and determine that a connection with the cellular network has been lost, wherein registering with the second IMS is based at least in part on the determination.

In some cases, the UE may scan for APs that support a first network and a second network; determine whether the APs support both a first network and a second network based on the scanning; and access the first service and the second service using a same AP or different APs based on the determination.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and methods in accordance with embodiments of the present subject matter are now described, by way of example only, and regarding the accompanying figures, in which:

Figure 1A:
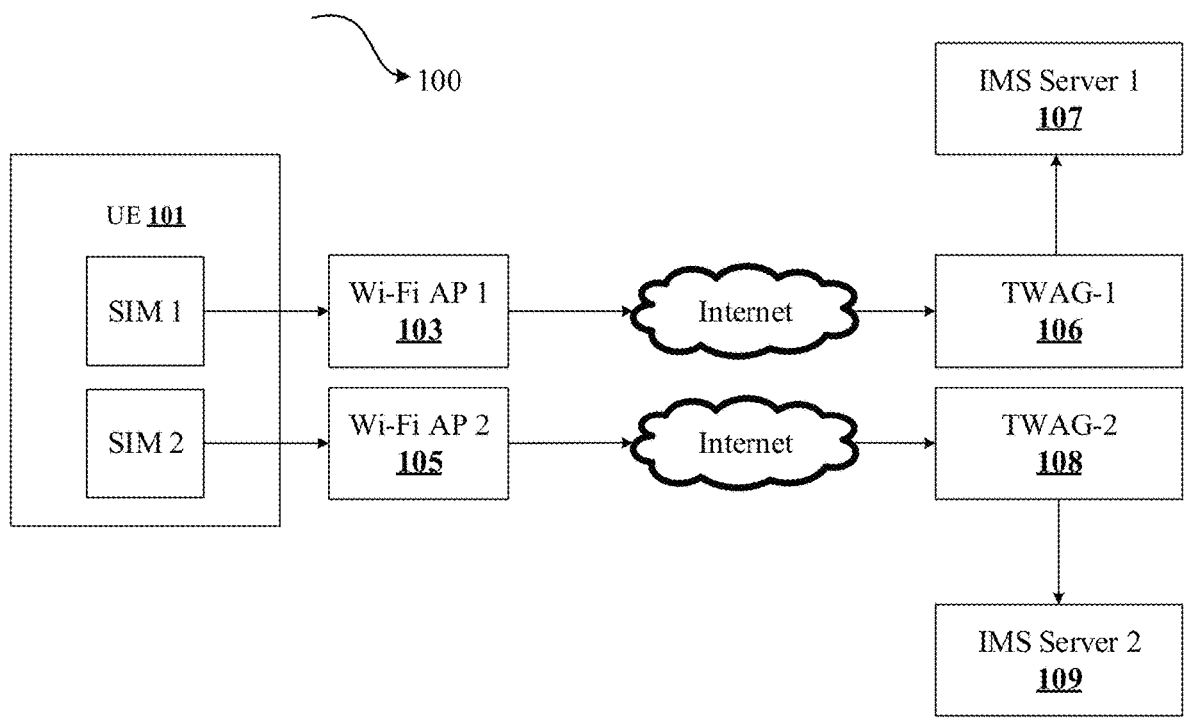
FIG. 1a shows an exemplary environment for accessing a plurality of services on Wi-Fi in accordance with some embodiments of the present disclosure

It should be appreciated by those skilled in the art that any block diagrams herein represent conceptual views of illustrative systems embodying the principles of the present subject matter. It will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

Systems and methods are described for accessing plurality of services on Wi-Fi by a User Equipment (UE) comprising a plurality of Subscriber Identification Module (SIM) cards. In conventional multi-SIM systems, various scenarios exist that may result in service interruptions (e.g., when a mobile device moves from one network to another network).

In a first example, SIM 1 may be LTE and VoWi-Fi calling enabled and SIM 2 may be LTE enabled. If a user receives or makes a call on SIM 2, and the user moves out of the LTE coverage area, the user may face call drop issues or mute issues. In a second example, a first user may be connected to a Television (TV) to stream through Wi-Fi. There is no option for a second user to simultaneously connect to the TV to stream through Wi-Fi that a first user is connected to.

In a third example, both SIM 1 and SIM 2 may have a Wi-Fi connection available with an operator. When one of the SIM is in VoWi-Fi call, then the other SIM cannot perform any services related to Rich Communication Services (RCS). For a fourth example, User A may be connected to an operator for a VoWi-Fi call support and usage of data through Wi-Fi. However, if the user wishes to connect to Home Wi-Fi, then the user may be required to disconnect operator Wi-Fi to use home services.

Therefore, according to conventional methods, use of Wi-Fi services in both the SIMs of the mobile device parallelly without interruption is not allowable. This would lead to underutilization of resources and leads to reduced user experience and more inconvenience.

In the present document, the word "exemplary" is used herein to mean "serving for example, instance, or illustration." Any embodiment or implementation of the present subject matter described herein as "exemplary" is not necessarily to be construed as preferred or advantageous over other embodiments.

While the disclosure is susceptible to various modifications and alternative forms, embodiments thereof have been shown by way of example in the drawings and will be described in detail below. It should be understood, however that the embodiments are not intended to limit the disclosure to the specific forms disclosed, but on the contrary, the disclosure is to cover all modifications, equivalents, and alternatives within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a UE for accessing a plurality of services on Wi-Fi. The UE may include a plurality of Subscriber Identity Module (SIM) cards wherein each of the plurality of SIM cards may be associated with a Media Access Control (MAC) identification. The first MAC ID associated with a first SIM card of the plurality of SIM cards is registered with a first IP Multimedia System (IMS) for use of a first service through a first Access Point (AP). The IMS provides IP multimedia services such as voice, video, text messaging over an IP network. The second MAC ID associated with the second SIM is also registered with a second IMS for use of a second service.

For example, the first service and the second service may include, but not limited to, Rich Communication Services (RCS), voice call, video call, and other supplementary services. The UE may access the first service through the registered first SIM card and access the second service through the registered second SIM card. The UE may access the first and second service when both the first MAC ID and the second MAC ID are registered. The first service and the second service may be accessed simultaneously without interrupting each other. The first service may be accessed through a first Radio Frequency band of the UE and the second service may be accessed through a second RF band. The first RF band may be different from the second RF band. For example, the first RF may be 5 MHz and the second RF may be 2.5 MHz. In this manner, the present disclosure allows the UE to access a plurality of services on Wi-Fi simultaneously. In one embodiment, a first SIM card may also be referred to as any one of a SIM card from the plurality of SIM cards. Likewise, a second SIM card may also be referred to as any other SIM card from a plurality of SIM cards.

Both Android and IOS based UE connections use Wi-Fi access points to access IP Multimedia Subsystem (IMS) services for telephone and IMS services. Thus, at an IMS Service, there exist no control to try another access point in parallel. Hence, suitable changes in telephony and IMS Services, along with an IMS stack on the modem side, may benefit from using dual services over Wi-Fi. Additionally, the IMS server may be connected with Enhanced Packet Data Gateway (ePDG) for both the SIMs to use Wi-Fi services simultaneously. A person skilled in the art would understand that any other operating system-based UE not mentioned explicitly may also be used in the present disclosure In the following detailed description of the embodiments of the disclosure, reference is made to the accompanying drawings that form a part hereof, and in which are shown by way of illustration specific embodiments in which the disclosure may be practiced. These embodiments are described in enough detail to enable those skilled in the art to practice the disclosure, and it is to be understood that other embodiments may be utilized and that changes may be made without departing from the scope of the present disclosure. The following description is, therefore, not to be taken in a limiting sense.

In an embodiment, the present disclosure provides a method and a UE 101 for accessing a plurality of services on Wi-Fi. This method applies to UE 101 comprising a plurality of SIM cards with a single MAC ID. For example, UE 101 may comprise 2 SIM cards or dual SIMs, SIM 1 and SIM 2 in the environment 100 shown in in FIG. 1a. For example, the UE 101 may be a mobile phone or a laptop computer with an adapter and the like. In some systems, when one SIM attempts to connect to a corresponding Wi-Fi AP, the other SIM may be disconnected from Wi-Fi services. However, in the present invention, both of the SIMs can use Wi-Fi services simultaneously. To use the services simultaneously, both of the SIMs are registered with a corresponding IMS server.

Figure 1B:
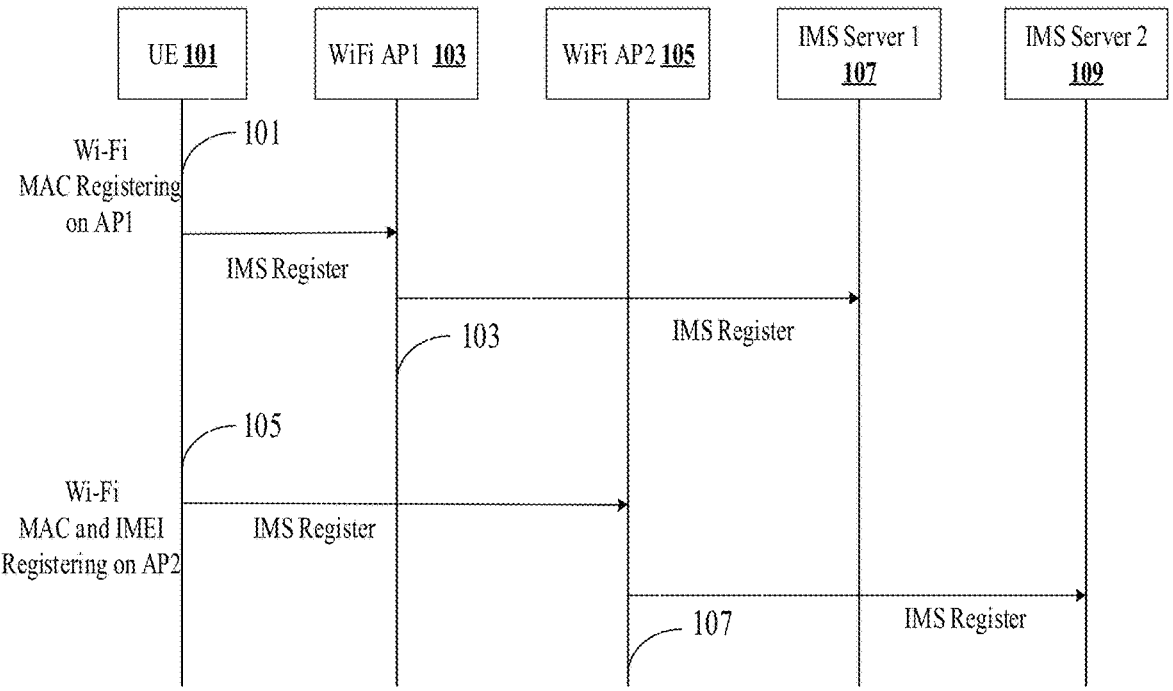
FIG. 1b shows a sequence diagram illustrating a process of registering MAC ID of UE with an IMS server in accordance with some embodiments of the present disclosure.

As shown in FIG. 1a, a SIM may be associated with a Wi-Fi Access Point (Wi-Fi AP) and a Trusted Wireless Access Gateway (TWAG). For example, the SIM 1 may be associated with Wi-Fi AP1 103 and TWAG-1 106. Through the Wi-Fi-AP1 103, the UE 101 may use the Wi-Fi service provided by IMS server 1 107. The SIM 2 may be associated with Wi-Fi AP2 105 and TWAG-2 108. Through the Wi-Fi-AP2 105, the UE may use the Wi-Fi service provided by IMS server 2 109. This is enabled by registering a MAC ID of the UE 101 with the IMS server. The registration process is illustrated in FIG. 1b. In an embodiment, the IMS server may be connected with Enhanced Packet Data Gateway (ePDG) for both the SIM cards to access the Wi-Fi services simultaneously.

FIG. 1b shows a sequence diagram illustrating process of registering MAC ID of UE 101 with an IMS server in accordance with some embodiments of the present disclosure. As shown in FIG. 1b, at step 101, the UE 101 transmits a request for registering a MAC on Wi-Fi AP1. For the purpose of illustration, the UE 101 is considered to have two SIM cards. Each SIM card may be associated with a MAC ID. The first SIM card may be associated with a first MAC ID and a second SIM card may be associated with a second MAC ID. The MAC ID is a unique ID assigned to a Network Interface Controller for the action of connecting to a network.

Thus, at step 101, the UE 101 may send a request to a first Access Point, Wi-Fi AP1 103, to register a first MAC ID with a first IMS server. The AP acts as a transceiver for transmitting and receiving data. The Wi-Fi AP1 103 may transmit the registration request to the IMS server 1 107 at step 103. The IMS server 1 107 may be configured to provide IP multimedia services such as voice, video, or text messaging over an IP network. Through the Wi-Fi AP1 103, the UE 101 may register a first MAC ID. At step 105, the UE 101 may send a request to Wi-Fi AP2 105 for registering the second MAC ID with the second IMS server along with an International Mobile station Equipment Identity (IMEI) registration. The Wi-Fi AP2 105 then transmits the request to the second IMS server for registering the second MAC ID at step 107.

In an embodiment, the first MAC ID or the second MAC ID may be proxy MAC ID. In this scenario, the first MAC ID is the proxy MAC ID whereas the second MAC ID is the original MAC ID. The second MAC ID is registered along with the IMEI number. In an embodiment, an application at Wi-Fi AP2 105 may authenticate the IMEI number and forward the request to the IMS server 2 109. The application at Wi-Fi AP1 103 may also authenticate the device based on the IMEI number and forward the request to the IMS server 1 107. In one embodiment, IMS authentication for both connections uses IMS Authentication and Key Agreement (AKA).

In an embodiment, the IMS Server may link each RF connectivity to a corresponding device identity. The IMS service checks that SIM 1 corresponds to the IMEI and the corresponding stack and registers SIM 1 to IMS server 1 107 using SIM 1 information. Once the IMS service receives information about Wi-Fi Access Point 2 through another RF band, the IMS service checks that SIM 2 corresponds to the IMEI and the corresponding stack and registers SIM 2 to IMS server 2 109 using SIM 2 information.

Figure 1C:
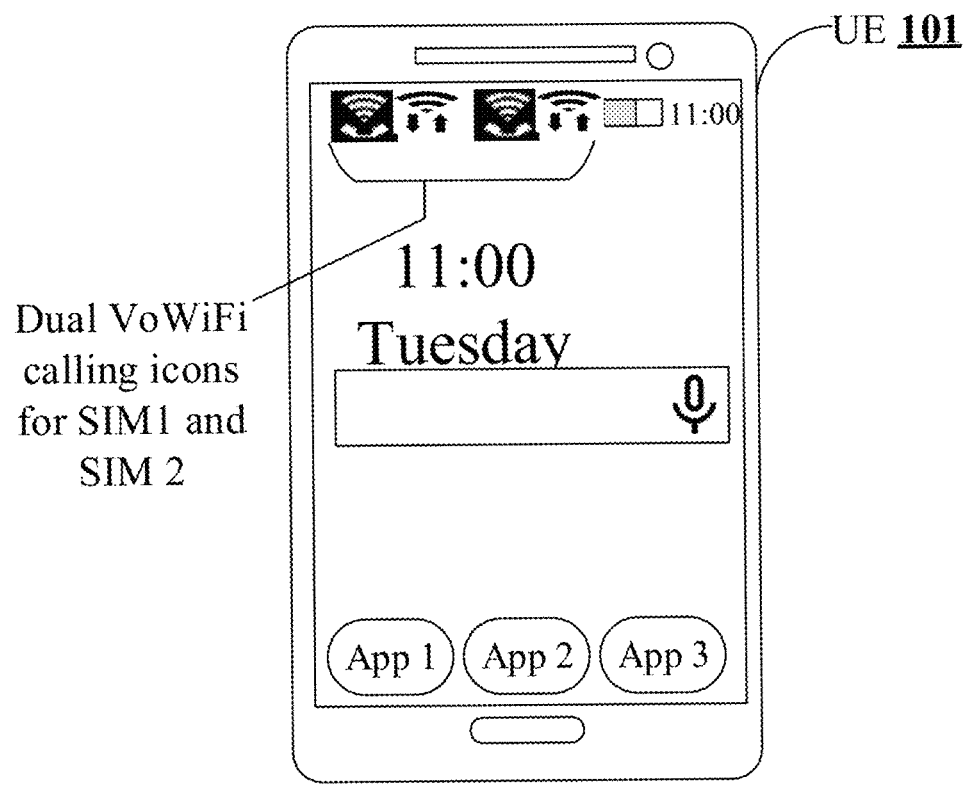
FIG. 1c shows display interface of UE representing dual VoWi-Fi calling icons in accordance with some embodiments of the present disclosure.

In an embodiment, once the first MAC ID and the second MAC ID are registered with a corresponding IMS server, the RF band of the UE 101 may be used to access the services from the IMS server. For example, the RF band 2.5 MHz may be used to access a first service by the first SIM and the RF band 5 MHz may be used to access a second service by the second SIM. The first service may be a voice call on Wi-Fi. The second service may be a data service on Wi-Fi. In this manner, the UE 101 may access a plurality of services on Wi-Fi simultaneously. In an embodiment, a dual Voice over Wi-Fi (VoWi-Fi) calling icon may be displayed on a display interface of the UE 101 upon registering with the IMS, as shown in FIG. 1c. This may be facilitated by providing configuration settings for each SIM card, a first SIM card and second SIM card, in the UE 101. Therefore, the VoWi-Fi calling options for both SIM cards may be displayed on the display interface of the UE 101.

In one embodiment, Android/IOS based UE 101 has an architecture of IMS and RCS protocol stacks where each has different Services. Particularly, the IMS Service connects to a Telephony manager for call related services. Additionally, the IMS Service connects an RCS service connects to RCS Application or native messaging Application for chat, file transfer, chatbot, presence availability and the like. A person skilled in the art would understand that any other operating system-based UE not mentioned explicitly, may also be used in the present disclosure In one embodiment, RCS stack is developed with RCS based IMS registration, a capability discovery procedure to discover the features common between contacts. For example, common features between contacts may be chat, file transfer, presence availability like online, offline, busy and the like, chat bot, and the like. In one embodiment, a user can use dual Wi-Fi services via an application (APP) mode where Original Equipment Manufacturer (OEM) provides an application for using these services or can, with native messaging (inbuilt). In a latter case, a user finds a setting for enabling advanced messaging (called RCS).

In an embodiment, where there more than two SIM cards are present, the concept of time sharing occurs. In this concept, based on a predefined time set, the SIMs would access the service through either an RF band of 2.5 MHz or 5 MHz. Some of the exemplary services which could be accessed by the UE 101 on Wi-Fi is explained using exemplary scenarios below.

Exemplary Scenarios:

When a user using a UE 101 with dual SIM is on a VoLTE call on SIM 1, and the user moves out of the LTE coverage area and moves to a Wi-Fi range, a call may be transferred automatically without disconnecting SIM 2 VoWi-Fi access point or SIM 2 Wi-Fi services. The process for the same is explained hereinbelow with the help of FIG. 2.

When a voice call is using VoWi-Fi of SIM 1 with 2.5 MHz and if any Packet Switch (PS) data is to be used, a data connection can be established to Wi-Fi of 5 Ghz band without any interruption on both Wi-Fi Bands such as 2.5 MHz and 5 MHz.

When one Wi-Fi Band is used for PS Data, other Wi-Fi bands can be used for Rich Communication Services (RCS) without any interruption of ongoing data transmission. Two user devices may be connected in parallel to TV to watch videos side-by-side. Home Wi-Fi may be connected in parallel to Operator Wi-Fi for VoWi-Fi calling, and data use.

In some embodiments, a UE 101 may include a dual SIM (e.g., SIM 1 and SIM 2). However, data offloading may not be supported if both the SIMs are from different service providers. The present invention facilitates data offloading when both the SIMs are from different service providers and when both cellular network and Wi-Fi network are used in parallel. For example, the user may be using data services of a cellular network in SIM 1 because a Wi-Fi connection may be unavailable. However, the Wi-Fi connection may be available in the SIM 2. Hence services are active in SIM 1 be offloaded to SIM 2 using the Wi-Fi connection. In an embodiment, the data offloading may be enabled if both the SIMs are from the same service providers, as both the SIMs may connect to the service provider simultaneously. Therefore, the present disclosure enables a data offloading feature irrespective of the service providers.

RCS features may be supported in parallel by using SIM 1 data or SIM 1 VoWi-Fi, which is connected simultaneously with SIM 2 data or SIM 2 VoWi-Fi. For example, the user may be using SIM 1 LTE data for messaging services and may be using SIM 2 for RCS services over Wi-Fi. The RCS services in SIM 2 may be used in parallel to the SIM 1 services without interruptions.

Figure 2:
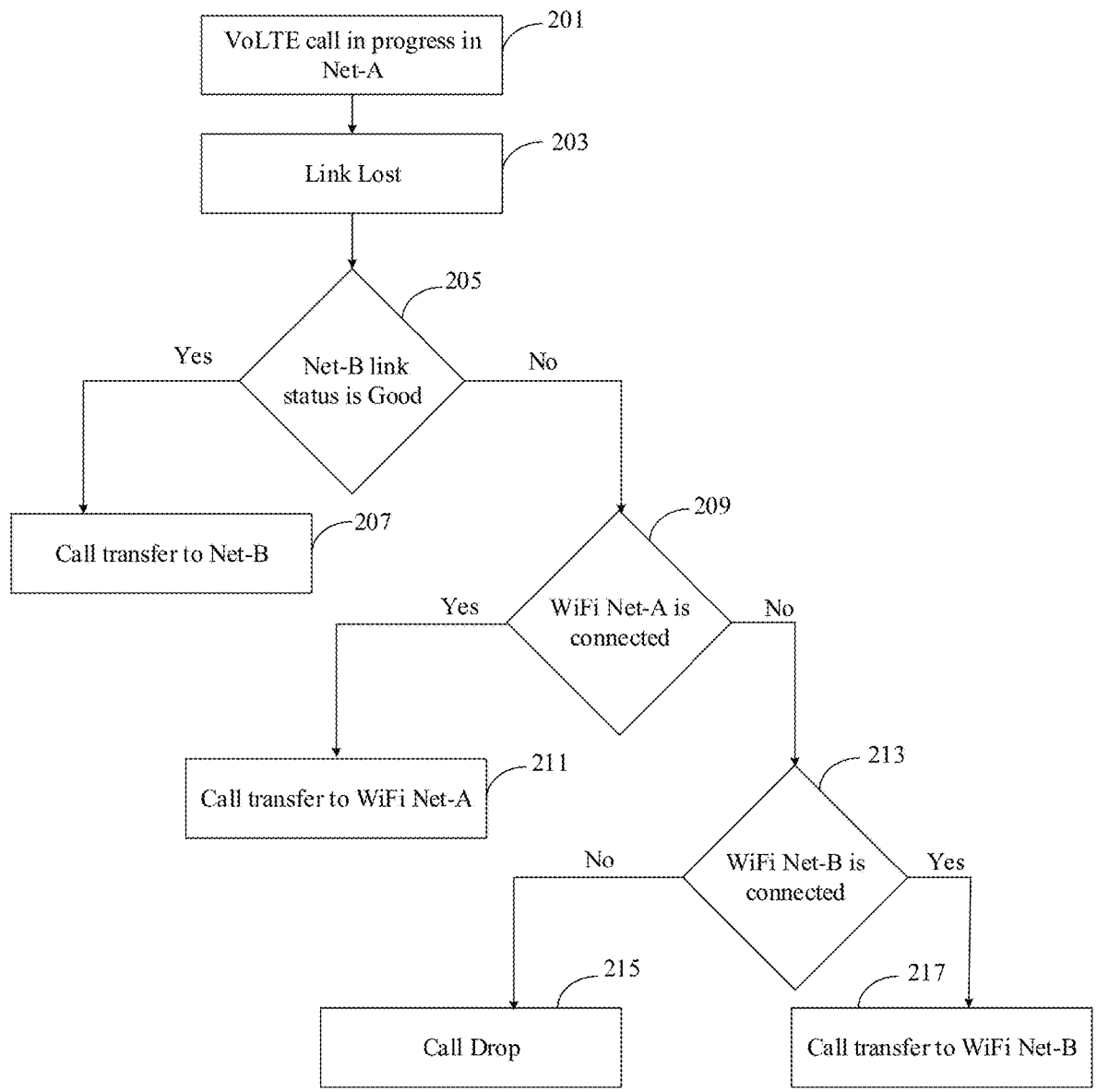
FIG. 2 shows a flowchart illustrating an exemplary process for call transfer to Wi-Fi from VoLTE call on LTE in accordance with some embodiments of the present disclosure.

FIG. 2 shows a flowchart illustrating an exemplary process for call transfer to Wi-Fi from VoLTE call on LTE in accordance with some embodiments of the present disclosure.

In this scenario, at step 201, the UE 101 may comprise 2 SIM cards wherein a VoLTE call may be in progress on network A (Net-A) associated with a first SIM of the UE 101. At step 203, a signal may be lost on Net-A. At step 205, the status of network B (Net-B) may be checked. Net-B is associated with SIM 2 of the UE 101. SIM 2 may be used by the UE 101 for RCS services. If the quality of the signal of Net-B is good, a call may be transferred to Net-B at step 207. If the quality of the signal is bad, the Wi-Fi connection on Net-A is checked at step 209. If the Wi-Fi on Net-A is connected, the call is transferred to Wi-Fi Net-A though Net-A at step 211, which is already providing RCS features for the user through SIM 2. If the Wi-Fi on Net-A is not connected, the Wi-Fi on Net-B is checked at step 213. If the Wi-Fi on Net-B is connected, the call is transferred to Wi-Fi Net-B at step 217. If the Wi-Fi on Net-B is not connected, the call is dropped. In this manner, both the services, such as call and data, can be simultaneously accessed over Wi-Fi.

Accordingly, embodiments of the present disclosure may include a UE 101 registering with a first IMS to access a first service over Wi-Fi (e.g., Wi-Fi Net-A) using a first SIM card of a plurality of SIM cards of a UE (i.e., SIM 1); registering with a second IMS to access a second service over Wi-Fi (e.g., Wi-Fi Net-B) using a second SIM card of the plurality of SIM cards (e.g., Sim 2); and accessing the first service and the second service simultaneously over Wi-Fi using the first SIM card and the second SIM card. In some cases, the UE may communicate over a Wi-Fi network with the first SIM card a cellular network with the second SIM card (or vice versa). The UE 101 may determine that a connection with the cellular network has been lost, and register with the second IMS (e.g., via Wi-Fi Net-A or Wi-Fi Net-B based at least in part on the determination.

Figure 3:
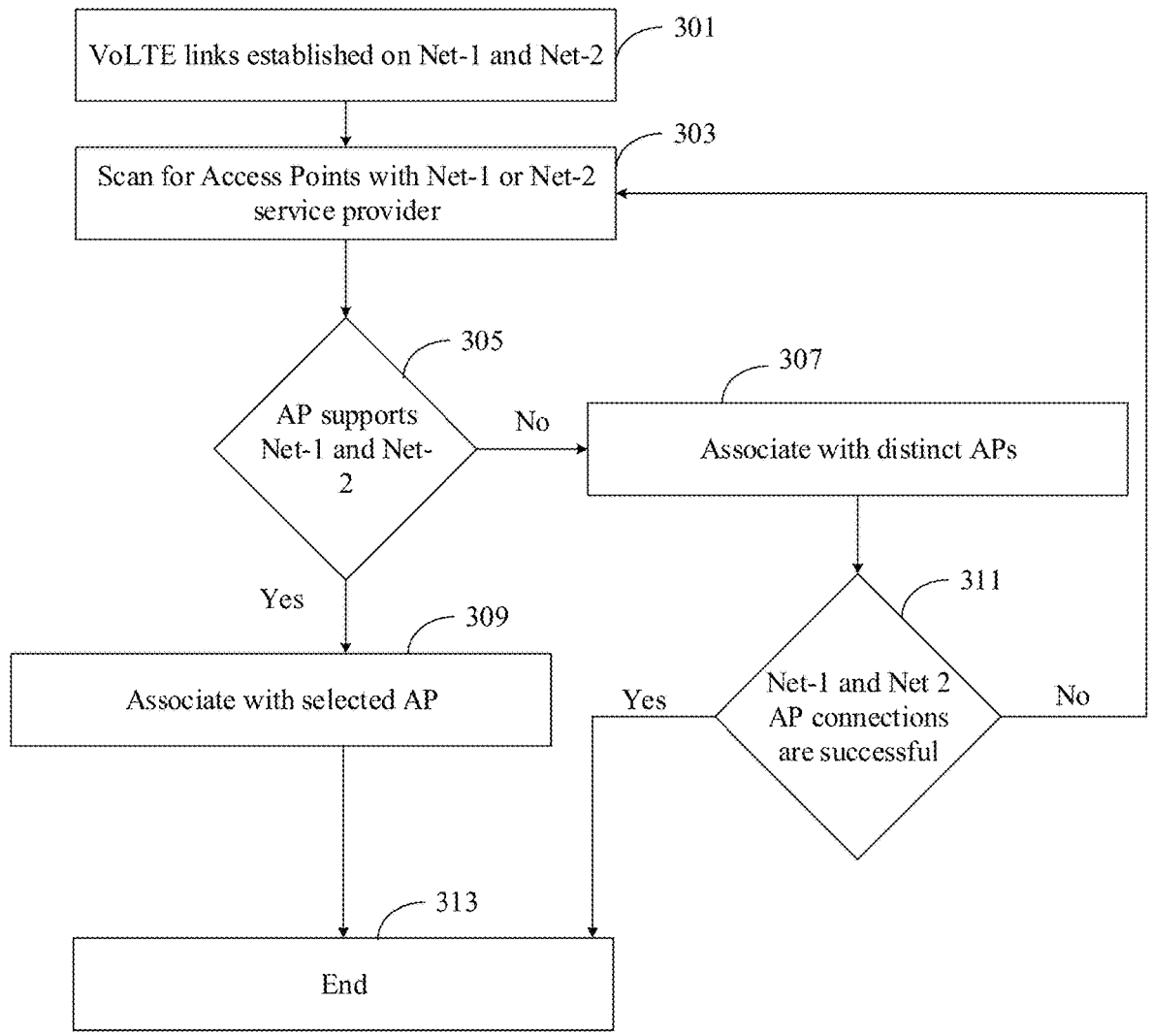
FIG. 3 shows a flowchart illustrating a process of AP connectivity in accordance with some embodiments of the present disclosure.

FIG. 3 shows a flowchart illustrating a process of AP connectivity in accordance with some embodiments of the present disclosure.

At block 301, the VoLTE link is established on networks Net-1 and Net-2. At block 303, the VoLTE application may scan for APs with Net-1 and Net-2. The device may determine whether APs support both Net-1 and Net-2. If the APs are found at block 305, then the VoLTE application for the call may associate with the selected AP at block 309. If the AP does not support both Net-1 and Net-2 at block 305, the method proceeds to block 307, wherein the VoLTE application may associate with distinct AP's. One AP, which supports Net-1 service provider (SP), and the other AP, which supports Net-2 SP, for successful Net-1 and Net-2 AP connections. At block 311, a check of successful connection of Net-1 and Net-2 AP is performed. If the Net-1 and Net-2 AP connections are successful, the method ends at block 313. If the connections are not successful, the method proceeds to block 303 to scan for the APs.

Thus, according to embodiments of the present disclosure, the UE 101 may scan for APs that support the first network Net-1 and the second network Net-2, and determine whether the APs support both of the networks. Then, the UE 101 may access a first service and a second service using a same AP or different APs based on the determination.

Figure 4:
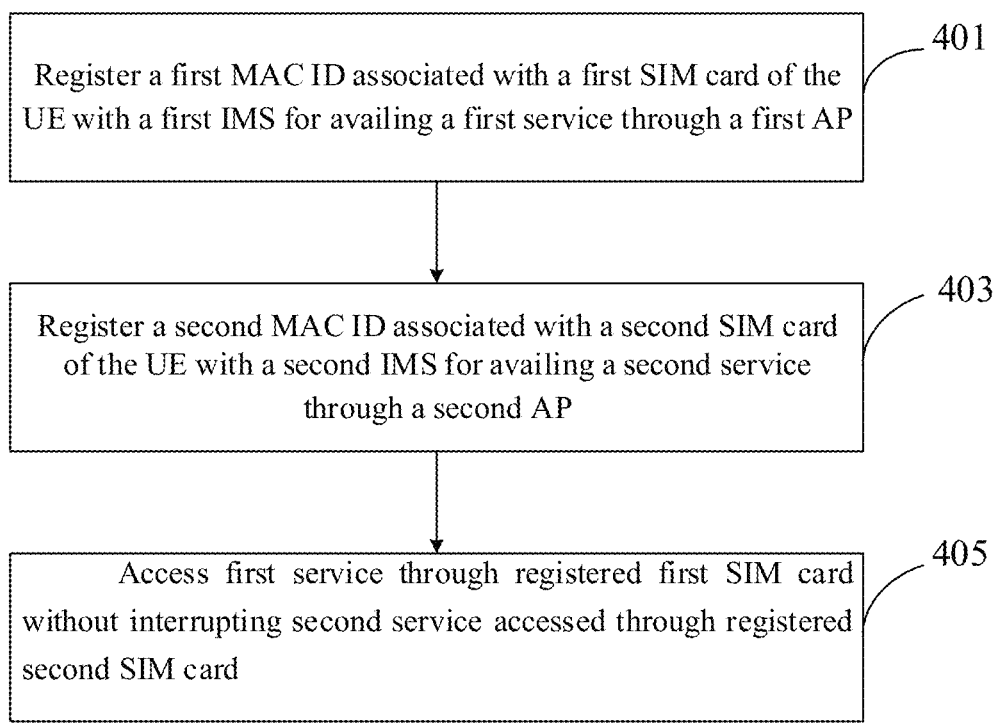
FIG. 4 shows a flowchart illustrating a method for registering MAC IDs of UE with an IMS server in accordance with embodiments of the present disclosure.

FIG. 4 shows a flowchart illustrating a method for accessing a plurality of services on Wi-Fi simultaneously in accordance with some embodiments of the present disclosure;

As illustrated in FIG. 4, the method includes one or more blocks illustrating a method for simultaneous access of a plurality of services on Wi-Fi. The method may be described in the general context of computer executable instructions. Generally, computer executable instructions can include routines, programs, objects, components, data structures, procedures, modules, and functions, which perform functions or implement abstract data types.

The order in which the method is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the method may include a UE 101 registering a first MAC ID with a first IMS 107 for use of a first service through a first AP 103. The first MAC ID may be associated with a first SIM card of the plurality of SIM cards in the UE 101.

At block 403, the method may include a UE 101 registering a second MAC ID with a second IMS 109 for use of a second service through a second AP 105. The second MAC ID may be associated with a second SIM card of the plurality of SIM cards in the UE 101

At block 405, the UE 101 may access the first service through the registered first SIM card, without interrupting access to the second service, through the registered second SIM card, upon registering the first MAC ID and the second MAC ID.

Thus, embodiments of the present disclosure may enable accessing services on Wi-Fi simultaneously. In an embodiment, the present disclosure improves dual SIM services in both transmitter and receiver in parallel from both cellular and Wi-Fi connectivity. In an embodiment, the present disclosure improves dual VoWi-Fi for Voice and RCS Services, which are dependent on operator data connections.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having", and variations thereof mean "including but not limited to", unless expressly specified otherwise.

The enumerated listing of items does not imply that any or all the items are mutually exclusive unless expressly specified otherwise. The terms "a", "an" and "the" mean "one or more" unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be clear that more than one device or article may be used in place of a single device or article. Where more than one device or article is described herein, it will be clear that a single device or article may be used in place of the more than one device or article or a different number of devices or articles may be used instead of the shown number of devices or programs. The functionality and/or the features of a device may be alternatively embodied by one or more other devices which are not explicitly described as having such functionality/features. Thus, other embodiments of the disclosure may not include the device itself.

Finally, the language used in the specification has been principally selected for readability and instructional purposes, and the language may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | User Equipment (UE) |
| 103 | Wi-Fi AP1 |
| 105 | Wi-Fi AP2 |
| 106 | TWAG-1 |
| 107 | IMS server 1 |
| 108 | TWAG-2 |
| 109 | IMS server 2 |

We claim:

1. A method of accessing plurality of services on Wi-Fi by a User Equipment (UE) comprising a plurality of Subscriber Identification Module (SIM) cards, the method comprising:
   registering, by the UE, a first Media Access Control (MAC) Identification (ID) with a first IP Multimedia System (IMS) providing a first service through a first Access Point (AP), wherein the first MAC ID is associated with a first SIM card of the plurality of SIM cards in the UE;
   registering, by the UE, a second MAC ID with a second IMS providing a second service through a second AP, wherein the second MAC ID is associated with a second SIM card of the plurality of SIM cards in the UE; and
   upon registering first MAC ID and the second MAC ID, simultaneously accessing, by the UE, the first service using the first SIM card and the second service using the second SIM card without interrupting the second service.

2. The method of claim 1, wherein the first MAC ID or the second MAC ID is a proxy MAC ID.

3. The method of claim 1, wherein the first service is accessed through a first Radio Frequency (RF) band of the UE and the second service is accessed through a second RF band which is different from the first RF band.

4. The method of claim 1, wherein the first service comprises Rich Communication Services (RCS), supplementary services, voice call, video call, or any combination thereof.

5. The method of claim 1, wherein the second service comprises Rich Communication Services (RCS), supplementary services, voice call video call, or any combination thereof.

6. The method of claim 1, further comprising:
   facilitating data offloading by transferring services from one SIM card associated with a cellular network to another SIM card associated with a Wi-Fi network.

7. The method of claim 1, further comprising:
   facilitating RCS features simultaneously in both the first SIM card and the second SIM card by connecting cellular data or VoWi-Fi associated with the first SIM card with cellular data or VoWi-Fi associated with the second SIM card.

8. The method of claim 1, wherein the first AP and the second AP are associated with a Wi-Fi network.

9. A User Equipment (UE) for accessing a plurality of services on Wi-Fi, the UE comprising:
   a plurality of SIM cards, wherein each of the plurality of SIM cards is associated with a Media Access Control (MAC) Identification (ID);
   a processor;
   a memory coupled to the processor; and
   one or more processor-executable instructions stored in the memory, which, on execution, causes the processor to:
   register a first MAC ID associated with a first SIM card of the plurality of SIM cards with a first IP Multimedia System (IMS) providing a first service through a first Access Point (AP);
   register a second MAC ID associated with a second SIM card of the plurality of SIM cards with a second IMS providing a second service through a second AP; and
   upon registering the first MAC ID and the second MAC ID, simultaneously access the first service using the first SIM card and the second service using the second SIM card without interrupting the second service.

10. The UE of claim 9, wherein one of the first MAC ID or the second MAC ID is a proxy MAC ID.

11. The UE of claim 9, wherein the first service is accessed through a first Radio Frequency (RF) band, and the second service is accessed through a second RF band which is different from the first RF band.

12. The UE of claim 9, wherein the first service comprises Rich Communication Services (RCS), supplementary services, voice call, video call, or any combination thereof.

13. The UE of claim 9, wherein the second service comprises Rich Communication Services (RCS), supplementary services, voice call, video call, or any combination thereof.

14. The UE of claim 9, wherein the processor facilitates data offloading by providing services of one SIM card associated with a cellular network, to another SIM card associated with a Wi-Fi network.

15. The UE of claim 9, wherein the processor facilitates RCS features simultaneously in both the first SIM card and the second SIM card by connecting cellular data or VoWi-Fi associated with the first SIM card with cellular data or VoWi-Fi associated with second SIM card.

16. The UE of claim 9, wherein the processor facilitates display of dual VoWi-Fi calling icons on a display interface of the UE upon registering with the first IMS and the second IMS by providing configuration settings for each SIM card.

17. The UE of claim 9, wherein the first AP and the second AP are associated with a Wi-Fi network.

\* \* \* \* \*